United States Patent
Watanabe et al.

(10) Patent No.: US 7,354,549 B2
(45) Date of Patent: Apr. 8, 2008

(54) CAST IRON MEMBER MANUFACTURING METHOD

(75) Inventors: Takao Watanabe, Utsunomiya (JP);
Toshiaki Onuma, Tochigi-ken (JP);
Yoshimi Ueda, Utsunomiya (JP);
Takeshi Sasaki, Tochigi-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 380 days.

(21) Appl. No.: 10/488,745

(22) PCT Filed: Sep. 26, 2002

(86) PCT No.: PCT/JP02/09939

§ 371 (c)(1),
(2), (4) Date: Mar. 9, 2004

(87) PCT Pub. No.: WO03/028923

PCT Pub. Date: Apr. 10, 2003

(65) Prior Publication Data

US 2004/0244881 A1    Dec. 9, 2004

(30) Foreign Application Priority Data

Sep. 27, 2001 (JP) .............................. 2001-296076

(51) Int. Cl.
*C21D 9/30* (2006.01)
*C21D 9/00* (2006.01)
*C21C 1/08* (2006.01)

(52) U.S. Cl. .................... 420/32; 148/612; 148/545
(58) Field of Classification Search ............. 148/612, 148/548, 321, 323; 420/32
See application file for complete search history.

(56) References Cited

U.S. PATENT DOCUMENTS

| | | | | |
|---|---|---|---|---|
| 3,107,995 A | * | 10/1963 | Katakura et al. | ............. 75/303 |
| 3,507,644 A | | 4/1970 | Coyle | |
| 3,762,915 A | * | 10/1973 | Heine et al. | .................. 420/32 |
| 4,209,324 A | * | 6/1980 | Wallace et al. | ............... 75/565 |
| 6,126,713 A | | 10/2000 | Igarashi et al. | |

FOREIGN PATENT DOCUMENTS

| | | |
|---|---|---|
| DE | 3912916 A1 | 2/1990 |
| EP | 0 535 386 A1 | 4/1993 |
| JP | 61-78548 A | 4/1986 |
| JP | 63-317622 A | 12/1988 |
| JP | 4-316 A | 1/1992 |
| JP | 404000325 * | 1/1992 |
| JP | 6-322425 A | 11/1994 |
| JP | 9-235609 A | 9/1997 |
| JP | 10-237528 A | 9/1998 |
| JP | 11-209843 A | 8/1999 |
| WO | WO-01/55458 A1 | 8/2001 |

* cited by examiner

*Primary Examiner*—Deborah Yee
(74) *Attorney, Agent, or Firm*—Birch, Stewart, Kolasch & Birch, LLP

(57) ABSTRACT

A nitrogen trapping agent is added by a metering hopper to raw materials, which are melted and poured into a mold cavity of a metal mold device (18). The molten metal is then cooled and solidified into a casting (B). Before the molten metal is fully cooled and solidified, free nitrogen present in the molten metal is quickly trapped by the nitrogen trapping agent, producing a nitride. Then, a chilled structure generated in the surface layer of the casting (B) is decomposed by heating the casting (B). Finally, the heated casting (B) is machined into a camshaft (A) which is a cast iron member as a final product.

5 Claims, 2 Drawing Sheets

| S1 | COOL AND SOLIDIFY MOLTEN IRON IN MOLD, PRODUCING CASTING |
| S2 | HEAT CASTING TO DECOMPOSE CHILLED STRUCUTRE IN SURFACE LAYER OF CASTING |
| S3 | MACHINE HEATED CASTING |

CAMSHAFT (CAST IRON MEMBER) FOR USE IN INTERNAL COMBUSTION ENGINE FOR VECHICLES

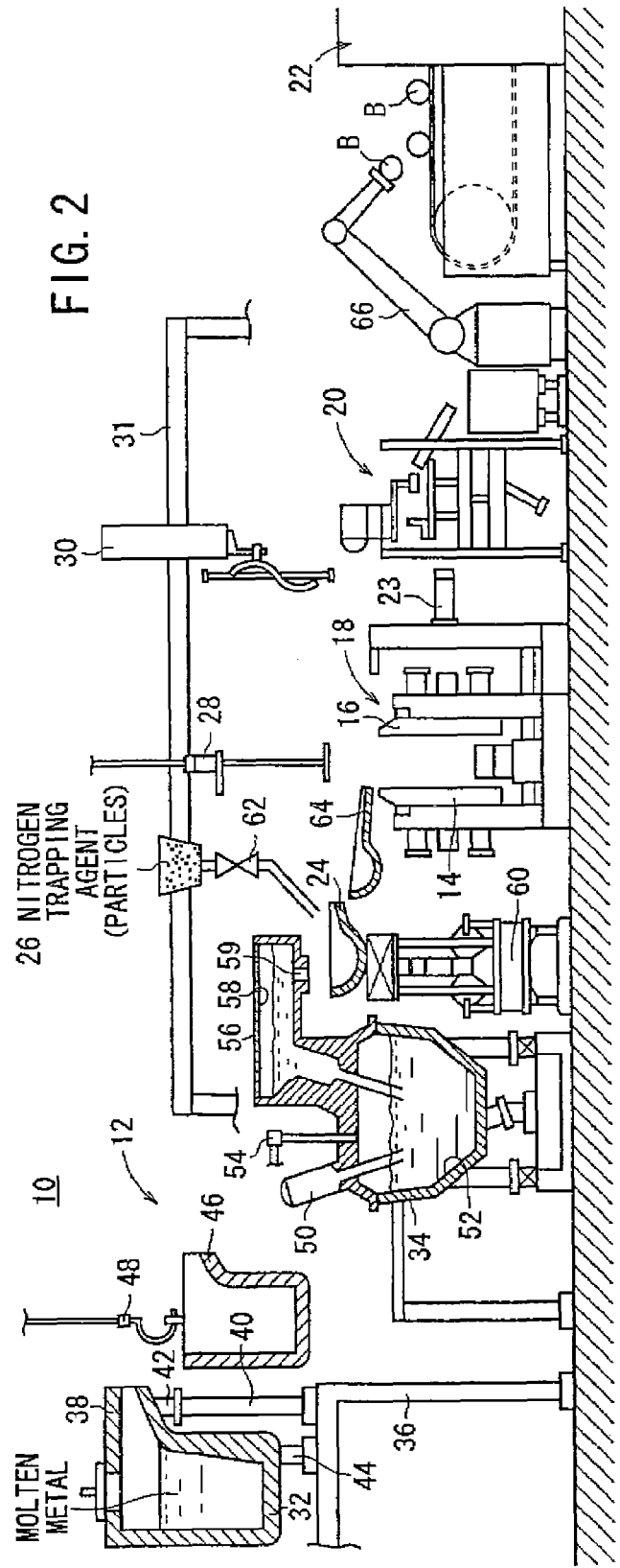

CAST IRON MEMBER MANUFACTURING METHOD

TECHNICAL FIELD

The present invention relates to a method of manufacturing a cast iron member, and more particularly to a method of manufacturing a cast iron member efficiently with a high yield by producing an easily machinable blank product (formed product).

BACKGROUND ART

FIG. 3 of the accompanying drawings shows a cast iron camshaft A, which is manufactured as follows: First, raw materials are melted into a molten metal. The raw materials include scrap steel, return scrap such as scrap from guides such as sprues and risers, defective cast iron members, and pig iron.

The molten metal is poured into a mold such as a sand mold, a metal mold, or the like, and then cooled and solidified into a black or formed product which is of a shape substantially corresponding to the final product, i.e., the cast iron camshaft A. The molten metal is cooled at a cooling rate which is generally about 240° C./minute for sand molds and about 1000° C./minute for metal molds.

Therefore, using metal molds is effective to greatly increase the cooling rate for the molten metal. Stated otherwise, using metal molds is advantageous in that blanks or formed products and camshafts A or final products can efficiently be manufactured.

When a molten metal is cooled and solidified at a high cooling rate, a chilled structure of cementite ($Fe_3c$) is formed in the surface layer of the produced casting. Since the chilled structure is very hard, the wear resistance of the surface layer of the casting is excessively high. If the casting is shaped into the camshaft A, then it is necessary to cut and otherwise machine the surface layer of the casting to predetermined dimensions. However, the excessively high resistance of the surface layer of the casting makes it difficult to cut and otherwise machine the surface layer of the casting.

To make the casting easily machinable, the casting is heated in a non-oxidizing atmosphere such as a reducing atmosphere or an inactive atmosphere to decompose the chilled structure into austenite ($\gamma$-Fe) and graphite, thus eliminating the chilled structure.

Finally, the heat-treated casting is cut and otherwise machined into a camshaft A as a final product with desired dimensional accuracy.

It is the general practice to melt the raw materials in the atmosphere. When the raw materials are melted, therefore, nitrogen present in the atmosphere is dissolved into the molten metal and exists as free nitrogen in the molten metal. Consequently, defective products that are formed from the molten metal necessarily contains nitrogen. If such defective products are used as return scrap, then the contained nitrogen is accumulated in successive generations of return scrap, with the result that castings containing a large amount of nitrogen will be produced.

The region which contains the fine pearlite is very hard. Even if the chilled structure is eliminated, the structure which is highly resistant to wear remains in the casting, making it difficult to cut and otherwise machine the casting. It takes a long period of time to cut and otherwise machine the casting to desired dimensions, thus reducing the efficiency with which to produce the camshaft A.

The very hard casting is liable to crack or break when it is subjected to various machining processes. Stated otherwise, the yield of camshafts A produced from the very hard casting is inevitably low.

The highly hard casting is liable to crack or break when it is subjected to various machining processes. Stated otherwise, the yield of camshafts A produced from the highly hard casting is inevitably low.

While the above problems can be solved by suppressing the generation of fine pearlite in castings, no process has been available in the art for suppressing the generation of fine pearlite in castings.

DISCLOSURE OF THE INVENTION

It is a principal object of the present invention to provide a method of manufacturing a cast iron member efficiently with a good yield to produce a casting which can easily be machined.

According to the present invention, there is provided a method of manufacturing a cast iron member, comprising the steps of cooling and solidifying molten iron containing a nitrogen trapping agent in a mold, producing a casting, while nitrogen existing in the molten iron is being trapped by the nitrogen trapping agent, heating the casting to decompose a chilled structure which is generated in the casting when the casting is produced, and machining the heated casting into a cast iron member as a final product.

Before the molten iron is fully cooled and solidified, free nitrogen present in the molten iron is trapped by the nitrogen trapping agent and turned into a nitride. For example, TiN is generated if Ti is used as the nitrogen trapping agent. Since the amount of free nitrogen contained in the casting is very small, the chilled structure is decomposed when the casting is heated.

Stated otherwise, the decomposition of the chilled structure generated in the casting is promoted when the casting is heated. Therefore, highly wear-resistant fine pearlite is prevented from being generated in the casting, and the casting can easily be cut and otherwise machined. Therefore, the cast iron member is produced with increased efficiency.

The casting which can easily be machined is generally resistant to cracking and breaking when it is machined. Therefore, the cast iron member can be produced with a high yield.

The cast iron member contains a trace amount of nitride dispersed therein which is generated when the nitrogen is trapped. Therefore, the cast iron member exhibits a behavior similar to a particle-dispersed strengthened composite member, and is tougher and stronger than camshafts constructed as general cast iron members.

A preferred example of the nitrogen trapping agent which can quickly be combined with nitrogen to form a nitride may be a material including as a constituent element at least one of Ti, V, Zr, Nb, and Al. The nitrogen trapping agent may be a pure material selected from the above metals or a mixture of materials selected from the above metals, or a compound or alloy composed of one or more of the above constituent elements.

The nitrogen trapping agent may be contained in a raw material of the molten iron.

The molten iron melted in a melting furnace or the like is usually exposed to the atmosphere while being delivered and introduced into a mold. Therefore, nitrogen may be dissolved from the atmosphere into the molten iron. Therefore, the nitrogen trapping agent should preferably be added to the molten iron immediately before it is introduced into the mold. When the nitrogen trapping agent is thus added, it can easily trap not only nitrogen contained in the raw materials of the molten iron, but also nitrogen dissolved from the atmosphere into the molten iron.

A preferred example of the cast iron member thus manufactured is a camshaft.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 is a schematic side elevational view of a casting apparatus for carrying out the method of manufacturing a cast iron member according to the present invention; and FIG. 3 is an elevational view of a camshaft.

BEST MODE FOR CARRYING OUT THE INVENTION

Figure 1:
FIG. 1 is a flowchart of a method of manufacturing a cast iron member according to the present invention.

As shown in FIG. 1, a method of manufacturing a cast iron member according to the present invention comprises a first step S1 of cooling and solidifying molten iron in a mold cavity to produce a casting, a second step S2 of decomposing a chilled structure in the casting by heating the casting, and a third step S3 of machining the heat-treated casting into a cast iron member.

The method of manufacturing a cast iron member as a camshaft A (see FIG. 3) will specifically be described below with respect to a casting apparatus which carries out the method.

As shown in FIG. 2, the casting apparatus, generally denoted by the reference numeral 10, has a pouring station 12, a metal mold device 18 having a fixed mold 14 and a movable mold 16, a correcting and cutting device 20, and a heating furnace 22. The movable mold 16 is movable toward and away from the fixed mold 14 by a cylinder 23 of the metal mold device 18.

The fixed mold 14 and the movable mold 16 jointly make up a mold cavity, which will be supplied with a molten metal from a ladle 24 disposed below a metering hopper 26 for adding a nitrogen trapping agent to the molten metal. A blow smoke device 28 is vertically displaceably disposed above the metal mold device 18. A workpiece removal robot 30 is horizontally movably disposed above a region downstream of the metal mold device 18. The blow smoke device 28, the workpiece removal robot 30, and the metering hopper 26 are supported on a support base 31.

The pouring station 12 has a melting furnace 32, a pressure pouring furnace 34, and a ladle 24 for receiving a molten metal discharged from the pressure pouring furnace 34 and introducing the received molten metal into the cavity of the metal mold device 18. The melting furnace 32 is mounted on a mount base 36.

The method of manufacturing a cast iron member according to the present invention is carried out as follows: First, raw materials which include scrap steel, return scrap such as scrap from guides such as sprues and risers, defective cast iron members, and pig iron are placed in the melting furnace 32. A steel material containing Ti that functions as a nitrogen trapping agent (hereinafter referred to as "nitrogen trapping agent containing steel") is also placed in the melting furnace 32. The nitrogen trapping agent containing steel may, for example, be a steel containing more Ti than general steels, e.g., Ti-added ultra-low carbon steel or SP steel. These steel materials usually contain 0.02 to 0.045 weight % of Ti.

The ratio of the nitrogen trapping agent containing steel to the raw materials may be selected such that the ratio between the measured amount of N contained in the raw materials and the measured amount of Ti contained in the nitrogen trapping agent containing steel (N:Ti) is about 1:1. In view of N dissolved from the atmosphere into the molten metal while the raw materials and the nitrogen trapping agent containing steel are being melted, the amount of Ti contained in the nitrogen trapping agent containing steel may be slightly greater than the amount of N contained in the raw materials.

The melting furnace 32 is then heated by a heat source outside thereof to melt the raw materials and the steel containing Ti into a molten metal. At this time, N dissolved from the atmosphere into the molten metal and N present in the raw materials are quickly combined with Ti, producing TiN.

The melting furnace 32 can be tilted. Specifically, a cylinder 40 vertically supported on the mount base 36 has a vertically movable rod 42 coupled to the lower end of a sprue 38 projecting from an upper portion of the melting furnace 32. The melting furnace 32 has a bottom portion spaced from the center of the bottom toward the sprue 38 and coupled to a support shaft 44 supported on the mount base 36. When the rod 42 of the cylinder 40 is vertically moved, the melting furnace 32 is tilted about the joint between the melting furnace 32 and the support shaft 44. For pouring the molten metal from the melting furnace 32 into a feed ladle 46 positioned between the melting furnace 32 and the pressure pouring furnace 34, the rod 42 is lowered to tilt the melting furnace 32 to direct the sprue 38 downwardly toward the feed ladle 46.

The feed ladle 46 is supported on a hook 48 of a crane (not shown) is delivered toward the pressure pouring furnace 34 by the crane. When the feed ladle 46 is positioned near the pressure pouring furnace 34, the feed ladle 46 is tilted toward the pressure pouring furnace 34 by a first tilting mechanism (not shown) to pour the molten metal from the feed ladle 46 through a funnel 50 into an inner chamber 52 of the pressure pouring furnace 34.

To the pressure pouring furnace 34, there is connected a gas supply pipe 54 for introducing a gas to increase the pressure in the inner chamber 52. When an inactive gas such as Ar or the like is introduced from the gas supply pipe 54 into the inner chamber 52, a pressure buildup is developed in the inner chamber 52 to force the molten metal in the inner chamber 52 into a passage 58 defined in a tapping unit 56 of the pressure pouring furnace 34. The molten metal introduced into the passage 58 is then discharged from an outlet 59 of the tapping unit 56 into the ladle 24.

The ladle 24 is placed on a load cell 60, which controls the amount of molten metal in the ladle 24 at a predetermined level. Specifically, when the weight of the molten metal in the ladle 24 is in conformity with a preset value set in the load cell 60, the load cell 60 sends a signal to a controller (not shown) electrically connected thereto, and the controller issues a control signal to close a valve (not shown) connected to the gas supply pipe 54. The gas supply pipe 54 stops the supply of the gas into the inner chamber 52 of the pressure pouring furnace 34, thereby stopping the supply of the molten metal from the outlet 59 of the tapping unit 56 to the ladle 24.

The molten metal is delivered from the melting furnace 32 by the feed ladle 46 and introduced from the tapping unit 56 into the ladle 24 in the atmosphere. Therefore, a trace amount of nitrogen tends to be dissolved from the atmosphere into the molten metal when it is delivered from the melting furnace 32 by the feed ladle 46 and introduced from the tapping unit 56 into the ladle 24. According to the present invention, a nitrogen trapping agent is added to the molten metal in the ladle 24 by the metering hopper 26 in order to trap such a trace amount of nitrogen dissolved from the atmosphere into the molten metal.

The nitrogen trapping agent is not limited to any materials insofar as they can quickly be combined with nitrogen. Preferred examples, however, are materials including as a constituent element at least one of Ti, V, Zr, Nb, and Al. The nitrogen trapping agent may be in the form of a powder of Ti particles or Ti—Al alloy particles, or particles of an alloy of a metal element having a nitrogen trapping capability and a metal element having no nitrogen trapping capability, e.g., Ti—Fe alloy particles.

If these metal elements are excessively present as a form other than a nitride in the molten metal, then they tend to obstruct the decomposition of the chilled structure, and may form eutectic graphite in combination with graphite produced when the chilled structure is decomposed. Therefore, the nitrogen trapping agent should preferably be added in such an amount that the metal element having nitrogen trapping capability is in a substantially equivalent amount to the nitrogen.

Since the nitrogen dissolved into the molten metal is in a trace amount ranging from 20 to 55 ppm, the nitrogen trapping agent is in the form of particles which are capable of easily controlling its added amount. The metering hopper 26 contains an amount of particles which is equal to or greater than the amount required for one adding event.

A valve 62 electrically connected to the controller is connected to the outlet of the metering hopper 26. When the load cell 60 detects the introduction of a predetermined amount of molten metal into the ladle 24, the controller issues a control signal to open the valve 62, thus adding the nitrogen trapping agent to the molten metal in the ladle 24. When the load cell then detects the addition of the nitrogen trapping agent sufficient to trap the amount of nitrogen (20 to 55 ppm) dissolved in the molten metal, the controller issues a control signal to close the valve 62.

The amount of the nitrogen trapping agent to be added may be selected in view of the proportion of the metal element having the nitrogen trapping capability in the nitrogen trapping agent, and the controller may be programmed to add the selected amount of the nitrogen trapping agent. For example, if the nitrogen trapping agent is in the form of Ti particles, then the controller may be programmed to add 20 to 55 ppm of the nitrogen trapping agent to the molten metal. If the nitrogen trapping agent is in the form of Ti—Fe alloy particles, then the controller may be programmed to add 20 to 55 ppm of Ti to the molten metal. If more nitrogen is expected to be dissolved into the molten metal, then the controller may be programmed to add a greater amount of the nitrogen trapping agent to the molten metal.

The ladle 24 can be tilted by a second tilting mechanism (not shown). When the ladle 24 is tilted, the molten metal in the ladle 24, to which the nitrogen trapping agent has been added, is poured through a sprue 64 of the metal mold device 18 into the mold cavity thereof, whereupon the first step S1 is started. Before the fixed mold 14 and the movable mold 16 are brought together, the blow smoke device 28 applies a parting agent to the surface of the mold cavity.

The molten metal introduced into the mold cavity of the metal mold device 18 is cooled at a cooling rate of about 1000° C./minute, and solidified into a casting B. The casting B has a chilled structure of cementite ($Fe_3c$) formed in the surface layer thereof.

The casting B is released from the mold cavity when the movable mold 16 is moved away from the fixed mold 14, and gripped by the workpiece removal robot 30. When the workpiece removal robot 30 is moved horizontally away from the metal mold device 18, the casting B is fed to the correcting and cutting device 20, which trims and otherwise finishes the casting B.

The casting B is then delivered by a transfer robot 66 into the heating furnace 22. In the heating furnace 22, the casting B is heated in the second step S2.

The casting B is heated in order to eliminate the chilled structure formed in the surface layer of the casting B. Specifically, heat is applied to the casting B to decompose the chilled structure ($Fe_3C$) into austenite ($\gamma$-Fe) and graphite. The casting B may be heated at such a temperature for such a period of time that the chilled structure can be fully decomposed. For example, the casting B may be heated at 930° C. for 30 minutes.

Before the molten metal is cooled and solidified, the free nitrogen present in the molten metal has been trapped by the nitrogen trapping agent such as Ti or the like and changed to a nitride such as TiN or the like. Consequently, since the amount of the free nitrogen contained in the casting B is very small, the decomposition of the chilled structure is not suppressed.

Stated otherwise, the chilled structure generated in the casting B can easily be decomposed by adding the nitrogen trapping agent to trap the free nitrogen. Therefore, fine pearlite is prevented from being generated in the casting B, and any highly wear-resistant structures are prevented from remaining in the casting B.

The casting B in which the chilled structure is decomposed is then cut and otherwise machined into a camshaft A of given dimensions (see FIG. 3) in the third step S3. As described above, the casting B has its chilled structure decomposed and contains no fine pearlite. Inasmuch as the hardness and wear resistance of the casting B is prevented from increasing excessively, the casting B can easily be cut and otherwise machined.

The casting B thus produced is highly prevented from cracking and breaking when it is machined. Therefore, the camshaft A can be produced with a high yield. Nevertheless, the hardness and wear resistance of the casting B is still kept within a range which is necessary and sufficient for use as the camshaft A.

When the casting B is machined to given dimensions, it is produced as a camshaft A (cast iron member) as a final product. The camshaft A thus produced contains a trace amount of nitride such as TiN or the like dispersed therein. Therefore, the camshaft A exhibits a behavior similar to a particle-dispersed strengthened composite member, and is tougher and stronger than camshafts constructed as general cast iron members.

In the above embodiment, the steel material containing Ti is used as the nitrogen trapping agent containing steel. However, a steel material containing at least one of V, Zr, Nb, and Al may be used as the nitrogen trapping agent containing steel.

The nitrogen trapping agent may be mixed with the molten metal anytime before the molten metal is cooled and solidified. For example, the raw materials may be mixed with a slightly excessive amount of the nitrogen trapping agent containing steel, and no nitrogen trapping agent may be added to the molten metal by the metering hopper 26. Alternatively, the raw materials may be melted into the molten metal without the addition of the nitrogen trapping agent, and a required amount of nitrogen trapping agent may be added to the molten metal in the ladle 24 by the metering hopper 26.

In the illustrated embodiment, the casting B is machined into the camshaft A as the cast iron member. However, the casting B may be machined into any of various other machine components.

In the method according to the illustrated embodiment, the metal molds are used to produce the casting B. However, the casting B may be produced using other molds insofar as it is cast under such conditions that a chilled structure is generated in the casting B.

INDUSTRIAL APPLICABILITY

In the method according to the present invention, the nitrogen trapping agent for trapping the free nitrogen existing in the molten metal is added to the molten metal, and thereafter the molten metal is cooled and solidified into the casting. When the casting is subsequently heated, the chilled structure in the casting is easily decomposed, preventing fine pearlite from remaining in the casting. As a result, the casting thus produced can subsequently be cut and otherwise machined with ease. Consequently, a cast iron member such as a camshaft or the like can be manufactured efficiently with a good yield.

The invention claimed is:

1. A method of manufacturing a cast iron member wherein free nitrogen is trapped by a nitrogen trapping agent before a casting is formed, said free nitrogen existing in molten iron and preventing cementite from being decomposed when the casting formed from said molten iron is heated, comprising the steps of:

measuring an amount of nitrogen contained in cast iron as a raw material beforehand;

melting raw material to form molten metal;

adding nitrogen trapping agent to said molten metal;

cooling and solidifying molten iron containing a nitrogen trapping agent in a mold, producing a casting, while free nitrogen existing in the molten iron is being trapped by reaction between said nitrogen trapping agent and nitrogen to produce a nitride, an amount of said nitrogen trapping agent being in a substantially equivalent amount to the sum of the amount of nitrogen contained in said cast iron as a raw material and an amount of nitrogen dissolved from the atmosphere into said molten iron when said cast iron as a raw material is melted;

heating the casting to decompose cementite having a chilled structure into graphite and austenite, said cementite being generated in the casting by rapidly cooling when the casting is produced; and machining the heated casting into a cast iron member as a final product, wherein said nitrogen trapping agent is Ti or Ti alloy and said nitride is TiN, and wherein Ti is added in said molten iron in the amount of 20 to 55 ppm to trap the amount of nitrogen which was dissolved from the atmosphere into the molten iron.

2. A method according to claim 1, wherein said nitrogen trapping agent is contained in a raw material of the molten iron.

3. A method according to claim 1, further comprising the step of:

adding the nitrogen trapping agent which has been metered to the molten iron to be introduced into said mold.

4. A method according to claim 3, wherein said nitrogen trapping agent comprises a powder.

5. A method according to claim 1, wherein said iron cast member is a camshaft.

* * * * *